(12) United States Patent
Iwasaki

(10) Patent No.: US 7,366,389 B2
(45) Date of Patent: Apr. 29, 2008

(54) MULTISTEP INDEX OPTICAL FIBER

(75) Inventor: Osamu Iwasaki, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/592,261

(22) PCT Filed: Feb. 22, 2005

(86) PCT No.: PCT/JP2005/003259

§ 371 (c)(1),
(2), (4) Date: Sep. 8, 2006

(87) PCT Pub. No.: WO2005/085923

PCT Pub. Date: Sep. 15, 2005

(65) Prior Publication Data

US 2007/0196064 A1   Aug. 23, 2007

(30) Foreign Application Priority Data

Mar. 8, 2004   (JP) .............................. 2004-063877

(51) Int. Cl.
*G02B 6/02* (2006.01)
(52) U.S. Cl. ...................... 385/127; 385/126
(58) Field of Classification Search ................ 385/127, 385/126
See application file for complete search history.

(56) References Cited

U.S. PATENT DOCUMENTS

| 6,952,518 B2 * | 10/2005 | Zhang et al. ................ 385/126 |
| 7,058,270 B2 * | 6/2006 | Kim et al. ................... 385/124 |
| 2005/0013572 A1 * | 1/2005 | Guan et al. .................. 385/127 |

FOREIGN PATENT DOCUMENTS

| JP | 53-17349 A | 2/1978 |
| JP | 56-78804 A | 6/1981 |
| JP | 10-111414 A | 4/1998 |
| JP | 11-52147 A | 2/1999 |

* cited by examiner

*Primary Examiner*—Ellen E. Kim
(74) *Attorney, Agent, or Firm*—Sughrue Mion, PLLC

(57) ABSTRACT

A multi step index optical fiber includes at least two concentrically arranged core portions, each having constant refractive index. The refractive indices of the core portions decrease toward the outer periphery of the optical fiber. The refractive indices of the core portions are set such that differences ΔN between refractive indices of adjacent core portions are uniform, and the distribution of the refractive indices approximates a G power distribution. Thereby, bandwidths on the order of several GHz/100 m can be realized.

4 Claims, 6 Drawing Sheets

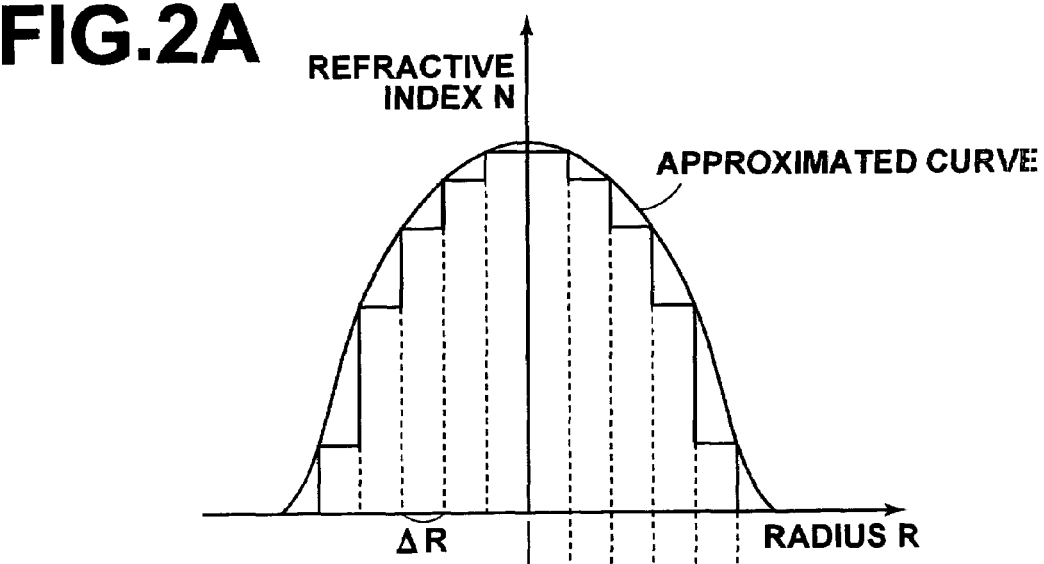
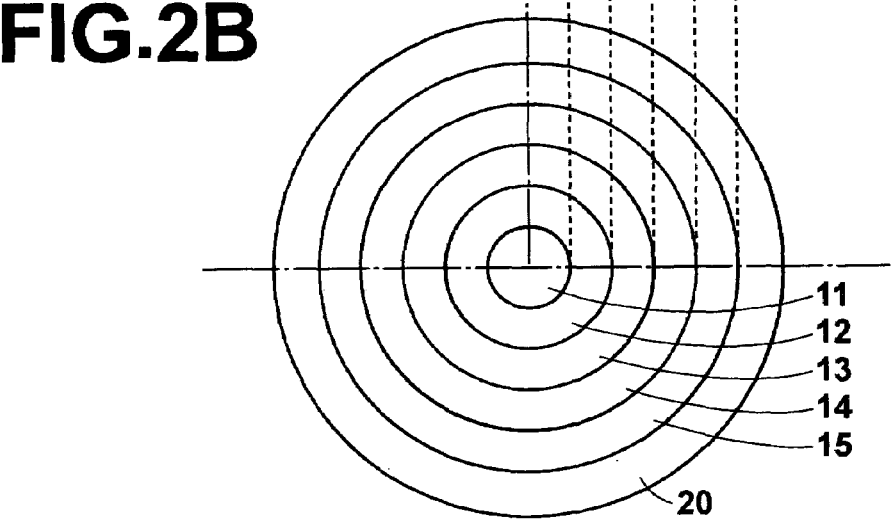

MULTISTEP INDEX OPTICAL FIBER

TECHNICAL FIELD

The present invention relates to an optical fiber. More specifically, the present invention relates to a multi step index optical fiber, comprising a plurality of core portions having different refractive indices from each other.

BACKGROUND ART

There are known conventional multi step index optical fibers, as disclosed in Japanese Unexamined Patent Publication No. 10 (1998)-111414. Multi step index optical fibers comprise at least two concentrically arranged core portions, each having a constant refractive index. The refractive indices of the core portions decrease from a central core portion to core portions at the outer periphery of the optical fiber.

The refractive indices of the plurality of core portions of these multi step index optical fibers are generally set such that they change along a so called G power distribution. In the G power distribution, the refractive index N at a position at radius R from the core center can be approximated by the following formula $$N = Nc \cdot \{1 - 2 \cdot \delta N \cdot (R/Rcore)^G\}^{1/2} \quad (1)$$

wherein:

Nc is the refractive index of the core center, $\delta N$ is the difference between the refractive index of the core center and the refractive index of the outermost peripheral portion of the core, and Rcore is the radius of the core.

Note that commonly, the value of G is set at approximately 2, in order to realize high bandwidth. In addition, the core portions in conventional multi step index optical fibers are formed such that the differences in radii among adjacent cores are uniform (a so called uniform core radius pitch configuration).

It is thought that high bandwidths approximating those of graded index optical fibers may be realized in the aforementioned conventional multi step index optical fibers, by increasing the number of steps of refractive indices, thereby smoothing the refractive index gradient. However, the maximum bandwidth obtainable with conventional multi step index optical fibers is about 1 GHz/100 m. It is considered to be difficult to obtain bandwidths on the order of several GHz/100 m with conventional multi step index optical fibers.

The present invention has been developed in view of the foregoing circumstances. It is an object of the present invention to provide a multi step index optical fiber which is capable of obtaining a bandwidth exceeding 1 GHz/100 m and on the order of several GHz/100 m.

DISCLOSURE OF THE INVENTION

The multi step index optical fiber according to the present invention comprises:

at least two concentrically arranged core portions, each having a constant refractive index, the refractive indices of the core portions decreasing from the center toward the periphery of the optical fiber, and is characterized by:

the refractive indices of the core portions being set such that differences between refractive indices of adjacent core portions are uniform, and the distribution of the refractive indices approximates a G power distribution.

Note that this multi step index fiber may be a so called plastic optical fiber, comprising cores formed of plastic.

FIG. 1A is a graph that illustrates an example of the basic refractive index distribution properties of a five step multi step index optical fiber according to the present invention. FIG. 1B is a schematic diagram of the cross section of the five step multi step index optical fiber. In FIG. 1B, reference numerals 11, 12, 13, 14, and 15 denote a first, second, third, fourth, and fifth core from the core center, respectively. Reference numeral 20 denotes a cladding layer provided at the outer periphery of the core 15. Note that although omitted from FIG. 1B, generally, a covering layer is provided on the outer periphery of the cladding 20.

For the purposes of comparison, FIG. 2A is a graph that illustrates an example of the basic refractive index distribution properties of a conventional five step multi step index optical fiber. FIG. 2B is a schematic diagram of the cross section of the conventional five step multi step index optical fiber. In the conventional multi step index optical fiber, the refractive indices of the cores 11 through 15 change along a curve that approximates the aforementioned G power distribution. In addition, the cores in the conventional multi step index optical fiber are formed such that the differences $\Delta R$ in radii among adjacent cores are uniform.

In contrast, in the optical fiber according to the present invention illustrated in FIG. 1, the refractive indices of the cores 11 through 15 change along a curve that approximates the aforementioned G power distribution, and each core is formed such that the differences $\Delta N$ in refractive indices among adjacent cores are uniform. In this configuration, a bandwidth exceeding 1 GHz/100 m and on the order of several GHz/100 m is capable of being obtained, as will be described in detail below, with reference to an embodiment.

BRIEF DESCRIPTION OF THE DRAWINGS

FIGS. 1A and 1B illustrate a multi step index optical fiber of the present invention, wherein FIG. 1A is a graph that illustrates an example of the basic refractive index distribution properties thereof; and FIG. 1B is a schematic diagram of the cross section thereof.

FIGS. 2A and 2B illustrate a conventional multi step index optical fiber, wherein FIG. 2A is a graph that illustrates an example of the basic refractive index distribution properties thereof; and FIG. 2B is a schematic diagram of the cross section thereof.

BEST MODE FOR CARRYING OUT THE INVENTION

Hereinafter, embodiments of the present invention will be described in detail with reference to the drawings.

Figure 1A:
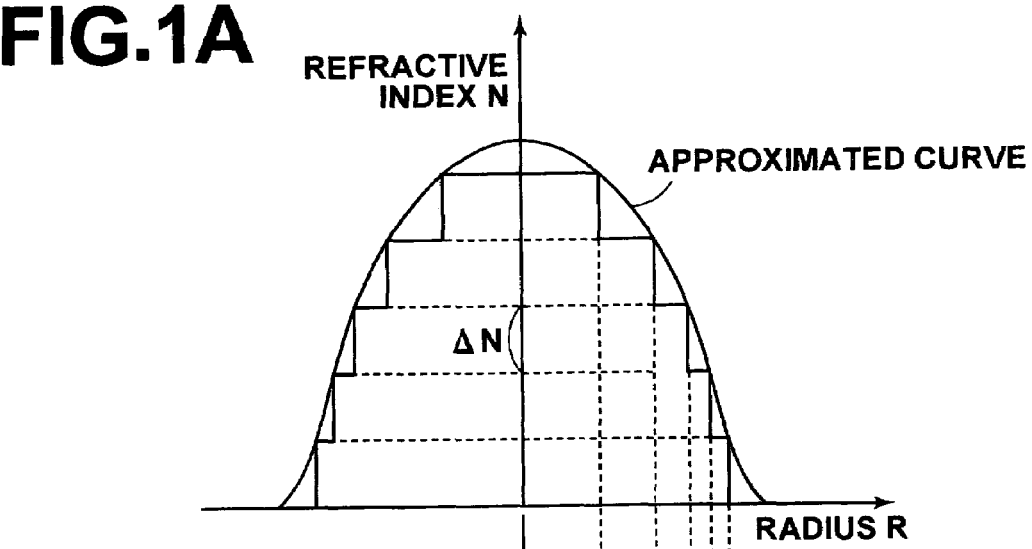
Figure 1B:
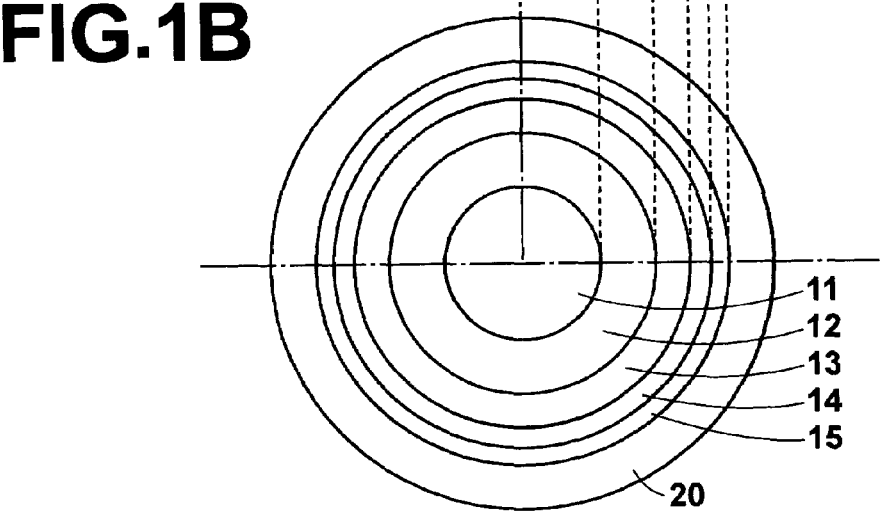

First, the results of simulations for deriving bandwidths regarding a multi step index fiber having the basic structure illustrated in FIG. 1B obtained by a computer will be described. The multi step index optical fiber illustrated in FIG. 1B had five steps in core refractive indices. In addition to this case, simulations were performed for configurations in which there are three and ten steps in core refractive indices. In all three cases, the numerical aperture (N.A.) of an incident optical system was set to 0.3, the intensity distribution of incident light was assumed to be a Gaussian distribution, and the length of the optical fiber was set to 100 m.

Figure 3:
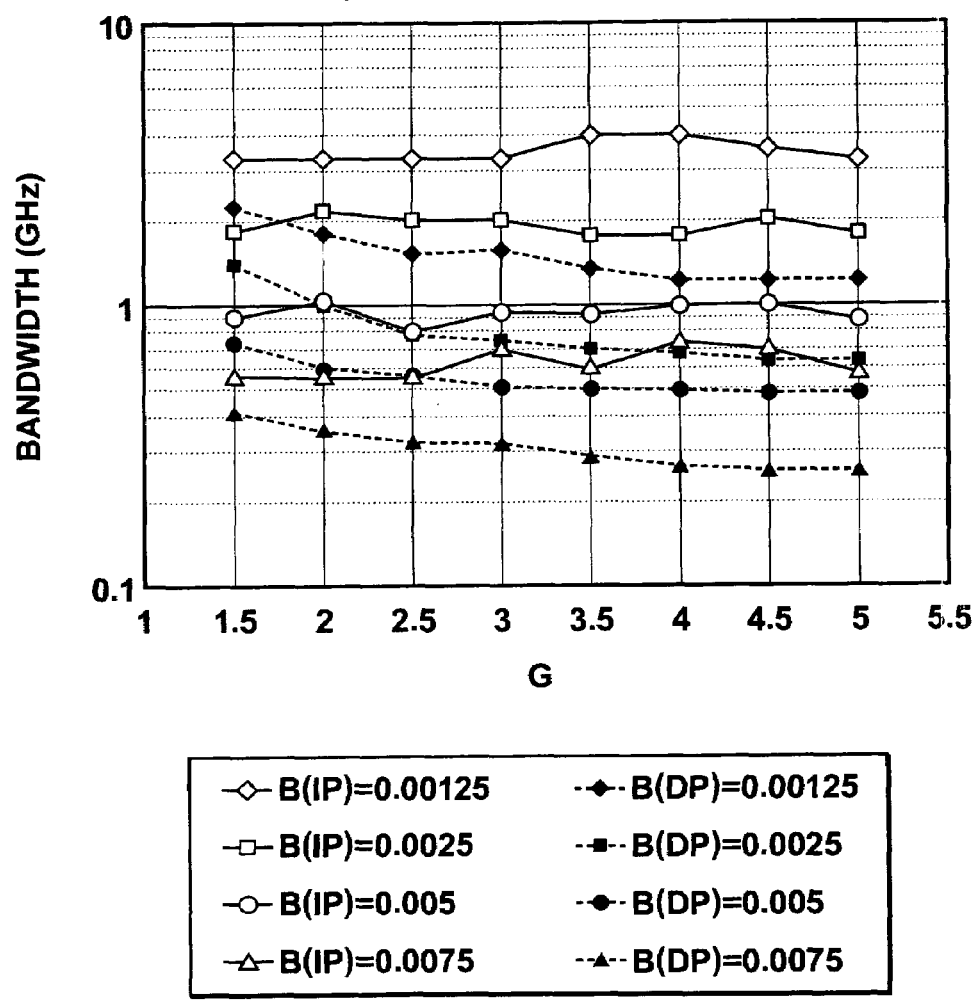
FIG. 3 is a graph that illustrates the calculation results of simulated bandwidths of a multi step index optical fiber according to the present invention and a conventional multi step index optical fiber in the case that there are three steps in core refractive indices.
Figure 4:
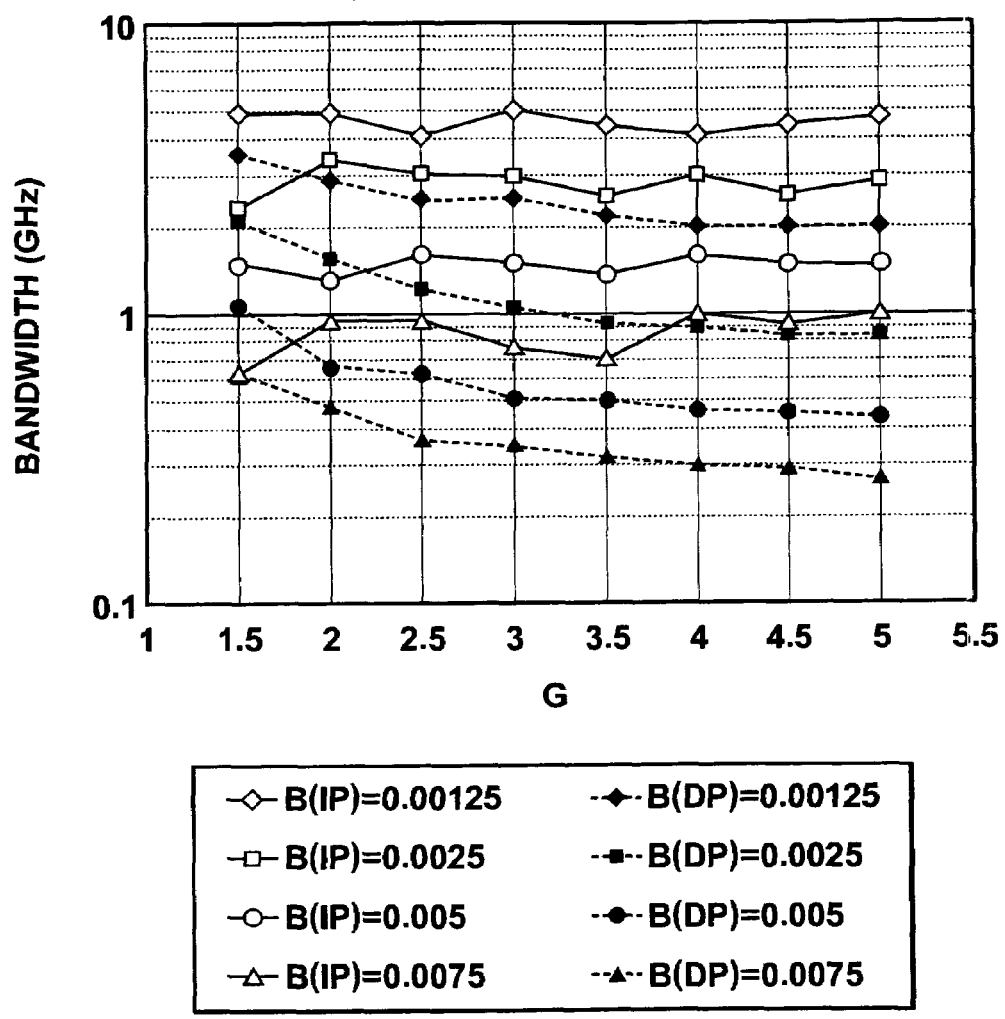
FIG. 4 is a graph that illustrates the calculation results of simulated bandwidths of a multi step index optical fiber according to the present invention and a conventional multi step index optical fiber in the case that there are five steps in core refractive indices.
Figure 5:
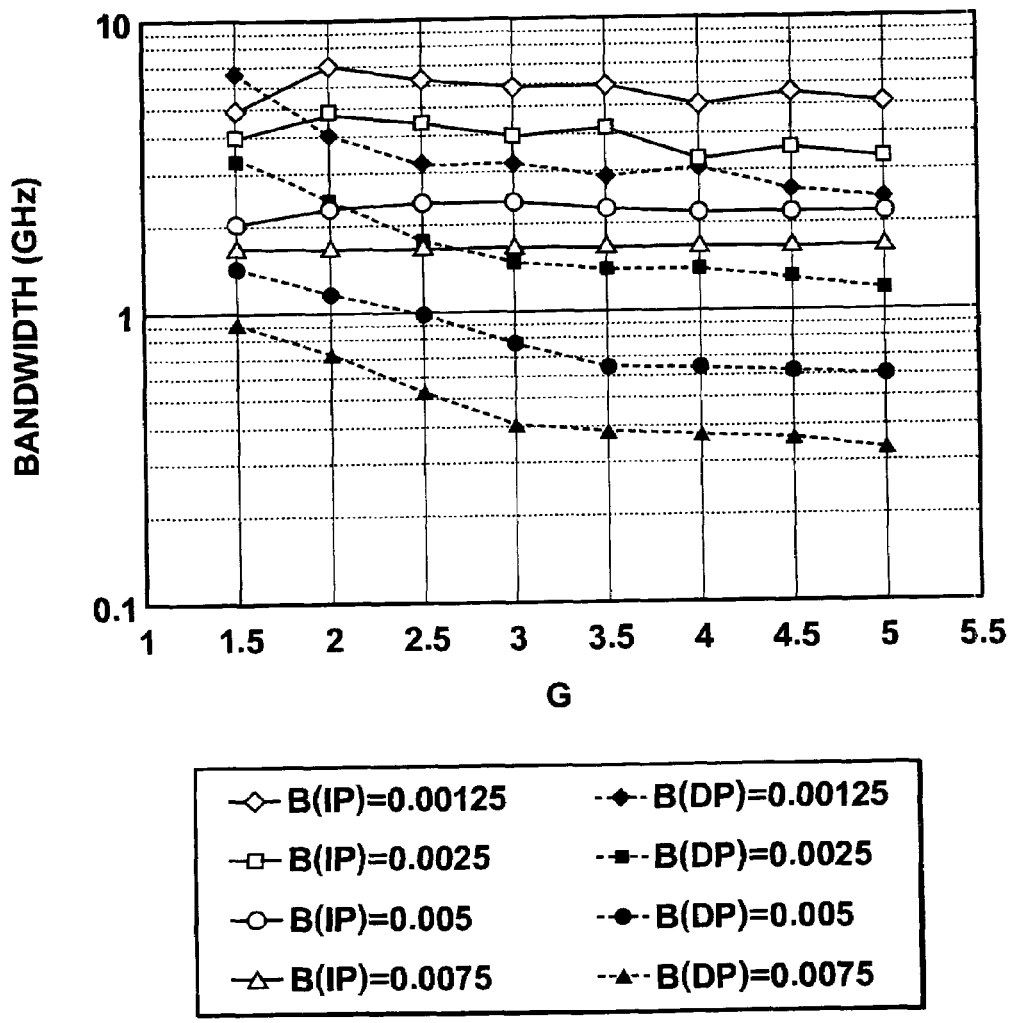
FIG. 5 is a graph that illustrates the calculation results of simulated bandwidths of a multi step index optical fiber according to the present invention and a conventional multi step index optical fiber in the case that there are ten steps in core refractive indices.

The simulation results for configurations in which there are three, five, and ten steps in core refractive indices are illustrated in FIGS. 3, 4, and 5, respectively. The bandwidth was derived for each configuration when the value of G within the G power distribution illustrated by Formula (1) was 0.0075, 0.005, 0.0025, and 0.00125 in the horizontal axis of the graphs. Note that the differences $\Delta N$ between refractive indices of adjacent core portions are values which are obtained by dividing the difference $\delta N$ between the refractive index of a central core portion and the refractive index of the outermost core portion by the number of steps. For comparison purposes, the results of similar simulations on conventional multi step index optical fibers having uniform core radius pitch configurations are also illustrated in the graphs. In the figures, the points denoted as B(IP) in the legend and connected by solid lines represent the simulation results of the multi step index optical fibers of the present invention. Meanwhile, the points denoted as B (DP) in the legend and connected by broken lines represent the simulation results of the conventional multi step index optical fibers having the uniform core radius pitch configurations.

As illustrated in FIGS. 3 through 5, the maximum bandwidths were approximately 3 GHz/100 m, approximately 5 GHz/100 m, and approximately 7 GHz/100 m for the configurations having three, five, and ten steps, respectively. It can also be understood from the graphs that changes in the value of G have little effect on the bandwidth.

The graphs also prove that the multi step index optical fibers according to the present invention, having uniform refractive index pitches, are capable of obtaining greater bandwidths than conventional multi step index optical fibers, having uniform core radius pitches, when compared under the same conditions.

Figure 6:
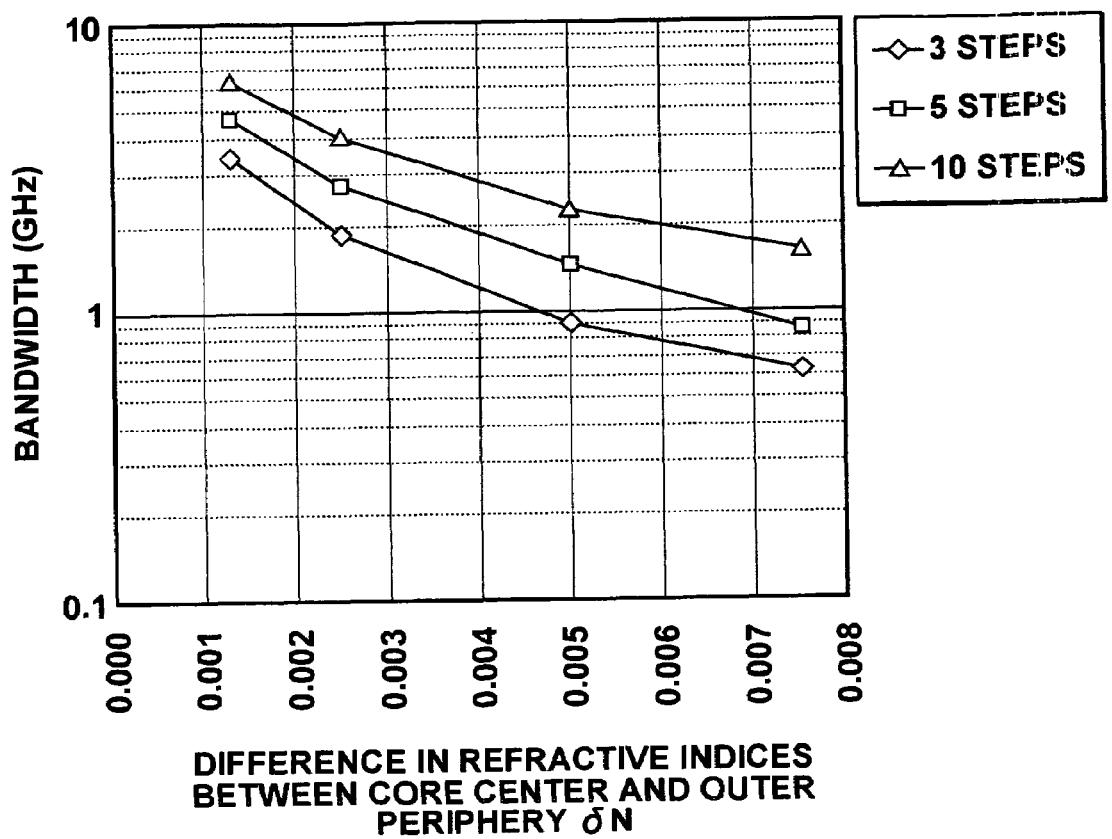
FIG. 6 is a graph that illustrates the relationship between bandwidths and a difference $\delta N$, between the refractive index of a core center and the refractive index of the outermost peripheral portion of the core.

Further, FIG. 6 illustrates the relationship between bandwidths and a difference $\delta N$, between the refractive index of a core center and the refractive index of the outermost peripheral portion of the core, for each number of steps. As illustrated in FIG. 6, the bandwidth becomes greater as the difference $\delta N$ in refractive indices becomes smaller. The graph of FIG. 6 also clearly illustrates the fact that greater bandwidths can be obtained by a greater number of steps.

As described in detail above, according to the present invention, it is possible to obtain a bandwidth exceeding 1 GHz/100 m and on the order of several GHz/100 m.

What is claimed is:

1. A multi step index optical fiber, comprising:
   at least three concentrically arranged core portions, each having a constant refractive index, the refractive indices of the cores portions decreasing from the center toward the periphery of the optical fiber; and
   cladding provided on the outer periphery of the outermost core portion;
   the refractive indices of the core portions being set such that differences between refractive indices of adjacent core portions are uniform, and the distribution of the refractive indices approximates a G power distribution.

2. A multi step index optical fiber as defined in claim 1, wherein:
   the core portions are formed of plastic.

3. A multi step index optical fiber as defined in claim 1, wherein:
   a difference $\delta N$ between the refractive index of a central core portion and the refractive index of the outermost core portion is within a range of 0.0075 to 0.00125.

4. A multi step index optical fiber as defined in claim 2, wherein:
   a difference $\delta N$ between the refractive index of a central core portion and the refractive index of the outermost core portion is within a range of 0.0075 to 0.00125.

* * * * *